(12) United States Patent
O'Donnell et al.

(10) Patent No.: US 8,955,052 B2
(45) Date of Patent: Feb. 10, 2015

(54) SYSTEM AND METHOD FOR MAINTAINING DUAL IDENTITY IN A SERVER PROCESS

(75) Inventors: William J. O'Donnell, Austin, TX (US); Elisa Ferracane, Austin, TX (US); Paul W. Bennett, Austin, TX (US); Michael C. Thompson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 12/788,682

(22) Filed: May 27, 2010

(65) Prior Publication Data

US 2011/0296496 A1    Dec. 1, 2011

(51) Int. Cl.
*H04L 29/06*    (2006.01)
*G06F 21/62*    (2013.01)
*G06F 21/31*    (2013.01)

(52) U.S. Cl.
CPC ............ *H04L 63/102* (2013.01); *G06F 21/629* (2013.01); *H04L 63/08* (2013.01); *H04L 63/0815* (2013.01); *H04L 63/10* (2013.01); *G06F 21/31* (2013.01)
USPC ...... 726/4; 726/12; 726/17; 726/27; 713/152; 713/153

(58) Field of Classification Search
CPC ..... H04L 63/08; H04L 63/0815; H04L 63/10; G06F 21/31
USPC ............................. 726/4, 6, 7; 713/152, 153
See application file for complete search history.

(56) References Cited

U.S. PATENT DOCUMENTS

| 5,815,574 | A | 9/1998 | Fortinsky |
| 6,377,994 | B1 * | 4/2002 | Ault et al. .................... 709/229 |
| 7,039,714 | B1 | 5/2006 | Blakley, III et al. |
| 2006/0005229 | A1 | 1/2006 | Palekar et al. |
| 2006/0100986 | A1 * | 5/2006 | MacPherson ..................... 707/2 |
| 2006/0137021 | A1 * | 6/2006 | Bender et al. ................... 726/27 |
| 2009/0099919 | A1 * | 4/2009 | Schultheiss et al. ............ 705/14 |
| 2009/0133110 | A1 | 5/2009 | Kumar et al. |
| 2009/0228950 | A1 | 9/2009 | Reed et al. |

(Continued)

FOREIGN PATENT DOCUMENTS

WO    WO 03/060718 A1    7/2003

OTHER PUBLICATIONS

International Search Report and Written Opinion for PCT Application No. PCT/EP2011/058641, mailed Jul. 22, 2011.

(Continued)

*Primary Examiner* — Michael Simitoski
*Assistant Examiner* — Gary Lavelle
(74) *Attorney, Agent, or Firm* — Terrile, Cannatti, Chambers & Holland, LLP; Stephen A. Terrile (57) ABSTRACT

A method, system and computer-usable medium are disclosed for managing identity authorizations to access information processing system resources. An application thread requiring access to target resources is initiated and associated with an authenticated client identity and a server identity. The resource authorization attribute of a resource required for execution of the application thread designates the use of a client identity, a server identity, or a client identity and server identity when attempting authorized access of the resource. The client identity, the server identity, or the client identity and server identity is then respectively used to access the target resource and the application thread is executed.

14 Claims, 6 Drawing Sheets

(56) References Cited

U.S. PATENT DOCUMENTS

2009/0300196 A1* 12/2009 Haghpassand ................ 709/229
2010/0017425 A1* 1/2010 Kao .............................. 707/102

OTHER PUBLICATIONS

Wikipedia, Thread (computer science), Wikipedia.org, retrieved from the internet May 5, 2010, http://en.wikipedia.org/w/index.php?title=Thread_%28computer_science%29&oldid=360338856, retrieved Jul. 8, 2011.

Robinson, JP.; et al., Web-enabled grid authentication in a Non-Kerkerbos environment, Grid Computing Workshop, AN-8885451; 2005.

Zarandioon, S. et al., Privacy-Aware Identity Management for Client-Side Mashup Applications, Nov. 2009.

Karjoth, G. et al., Access Control with IBM Tivoli Access Manager, ACM Transactions on Information and System Security, vol. 6, No. 2, May 2003.

* cited by examiner

SYSTEM AND METHOD FOR MAINTAINING DUAL IDENTITY IN A SERVER PROCESS

BACKGROUND OF THE INVENTION

1. Field of the Invention

The present invention relates in general to the field of computers and similar technologies, and in particular to software utilized in this field. Still more particularly, it relates to managing identity authorizations to access information processing system resources.

2. Description of the Related Art

The use of application servers has become popular in recent years to perform a variety of tasks across multiple applications. In general, a client submits a request to an application server, which acts as an intermediary between the client and other resources making up a distributed computer environment. As such, the application server may perform tasks such as verifying the client's security credentials, establishing a client identity to identify an authenticated client, and determining which information processing resources within the distributed computer environment the client is authorized to access for executing the client's request. The application server then forwards the request to the appropriate resource on behalf of the client. After the request executes on the appropriate resource, the application server sends the response to the client.

Such application servers are typically designed to use a corresponding server identity, which identifies the application server when an application thread attempts to access resources during its execution. However, some application servers offer the option to switch the server identity on an application thread to a corresponding authenticated client identity. In such cases, the application server uses the authenticated client identity instead of its own server identity when attempting to access a requested resource. Yet some resources may not allow access by an authenticated client identity when executing an application thread. Instead, access may be restricted to a server identity.

However, knowing which resource requires which identity for authorized access can be challenging. In some cases, it may be one or the other. In other cases, it may be both. For example, a business application running under a given application thread might need to read data from a file using the authenticated client identity specific to the application. Later in the execution flow, the same application may need to write out log data using the server identity. In this example, in order to protect the integrity of the application log data, the application log allows only the server identity to write, while all other identities can read. In view of the foregoing, there is a need for ensuring that either, or both, the authenticated client identity and the server identity can be used as appropriate to authorize access to target resources as they are needed.

SUMMARY OF THE INVENTION

A method, system and computer-usable medium are disclosed for managing identity authorizations to access information processing system resources ("resources"). In various embodiments, a user's authentication credentials are provided to an application server and an authenticated client identity is generated. An application thread requiring access to target resources is initiated and then associated with the authenticated client identity and the server identity associated with the application server. A target resource required for execution of the application thread is selected and its associated resource authorization attribute is determined, followed by retrieving corresponding authorization policies. A determination is then made whether the resource authorization attribute designates the use of a client identity, a server identity, or a client identity and server identity when attempting authorized access of the target resource.

In various embodiments, the client identity and the server identity are contained in an Accessor Environment Element (ACEE). In various other embodiments, the application server is augmented with logic to manage multiple identities when the operating system it uses does not support managing multiple concurrent identities per process. In one embodiment, the application server spawns and maintains a client worker thread, for every authenticated client identity, which in turn is mapped to the server identity. The client worker thread is then used to perform operations on behalf of the authenticated client identity. In another embodiment, the application thread requests the target resource from the client worker thread, and if access authorization fails, then the server identity is used to attempt access of target resources. In yet another embodiment, the application server maintains a server worker thread, which uses the authenticated client identity to attempt access to target resources.

If it is determined that the client identity, or the server identity, is designated, then the client identity or the server identity is respectively used to attempt authorized access of the target resource according to the retrieved authorization policy. However, if it is determined that the client identity and the server identity is designated, then the client identity and the server identity are used to attempt authorized access of the target resource according to the retrieved authorization policy. If access to the target resource is authorized for the client identity, the server identity, or the client identity and server identity as previously described, then the target resource is accessed and the application thread requesting access to the target resource is executed.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for managing identity authorizations to access information processing system resources. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Also, it will be appreciated that the computer readable medium may be located on a server and that the computer usable program code may be downloaded from the server for execution on the client (i.e., the computer usable program code are deployable to a client computer from a server at a remote location.)

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
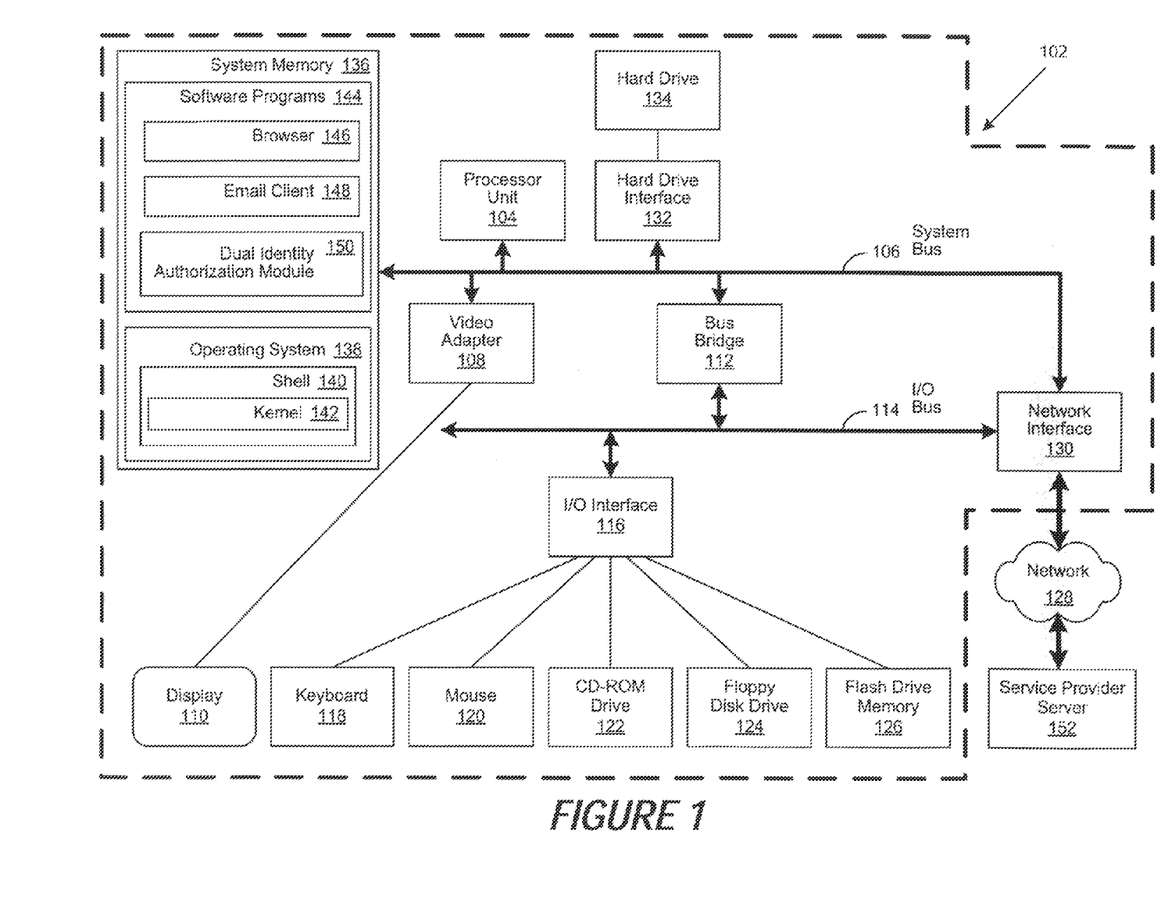
FIG. 1 depicts an exemplary client computer in which the present invention may be implemented.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a dual identity authorization module 150. The dual identity authorization module 150 includes code for implementing the processes described in FIGS. 2-4 described hereinbelow. In one embodiment, client computer 102 is able to download the dual identity authorization module 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
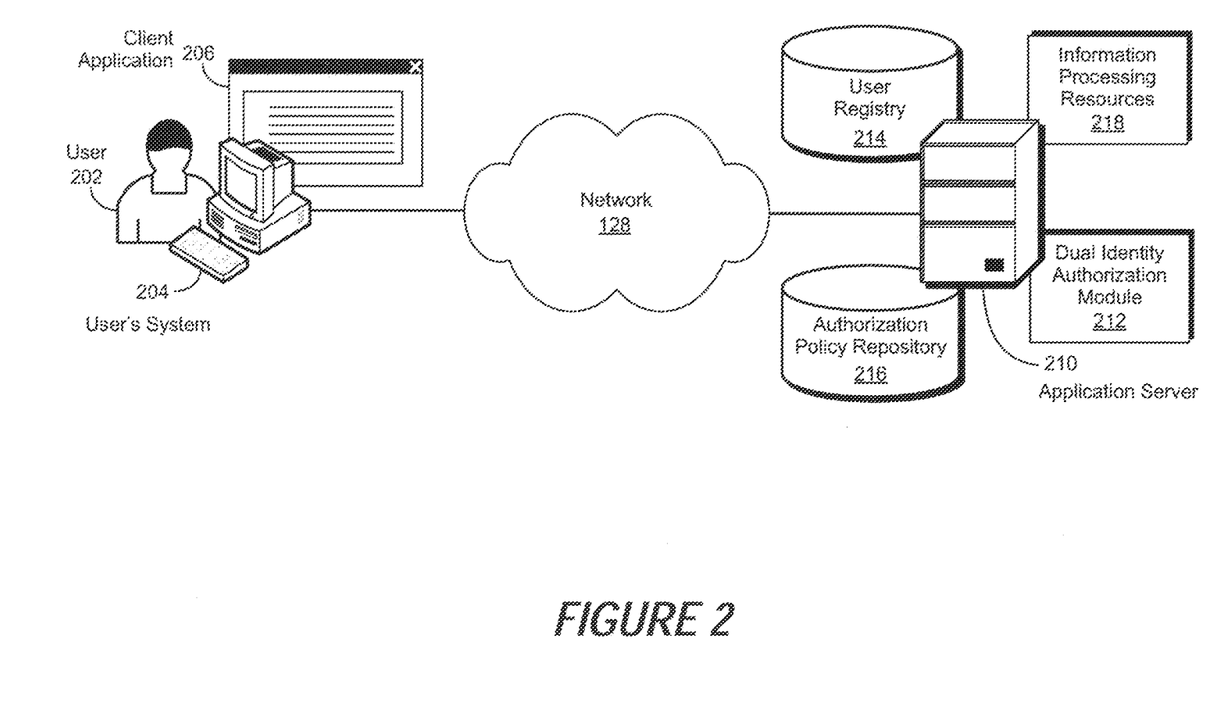
FIG. 2 is a generalized block diagram of the operation of a dual identity authorization module for managing access to resources.

FIG. 2 is a generalized block diagram of the operation of a dual identity authorization module as implemented in accordance with an embodiment of the invention for managing access to resources. In various embodiments, a user 202 operates a user system 204 to execute a client application 206. In these and other embodiments, the user 202 provides authentication credentials to an application server 210 over a connection to network 128. The application server 210, or an associated server such as an authentication server connected to network 128 or application server 210, then retrieves user data stored in user registry 214. The retrieved user data and the provided authentication credentials are then processed to generate an authenticated client identity. An application thread requiring access to target information processing resources ("resources") 218 is initiated and then associated with the aforementioned authenticated client identity and the server identity associated with the application server 210. As used herein, an information processing resource refers to any device, data, or process used in the processing of information by application server 210. As an example, information processing resources may comprise a processor, memory, peripheral devices such as a disk or tape drive, data stored in a file or memory, or a process performed by a computing device, a mechanical device, or a human. Skilled practitioners of the art will recognize that there are many such examples of such information processing resources and that the foregoing is not intended to limit the spirit, scope, or intent of the present invention. Also, skilled practitioners in the art will recognize that many variations on the operations such as the aforementioned authentication are known in the art.

A target resource 218 required for execution of the application thread is selected and its associated resource authorization attribute is determined, followed by retrieving corresponding authorization policies from the authorization policy repository 216. A determination is then made whether the resource authorization attribute designates the use of a client identity, a server identity, or a client identity and server identity when attempting authorized access of the target resource.

In various embodiments, the server identity is tracked by adding functionality to the application server 210. In one embodiment, the server identity is contained in a security context called an Accessor Environment Element (ACEE), which is operable to maintain both the client identity and the server identity. In various embodiments, the server identity is stored in a data cache of the ACEE. Such caches of ACEEs, which are likewise operable to maintain multiple concurrent users, are indexed by a key that is typically derived by a hash function from the individual identities associated with each ACEE. As an example, the z/OS operating system produced by International Business Machines® (IBM) keeps track of the server identity represented by one ACEE and likewise keeps track of the client identity represented by another ACEE.

In various other embodiments, the application server 210 is augmented with logic to manage multiple identities when the operating system it uses does not support managing multiple concurrent identities per process. One example implementation is an IBM WebSphere Application Server running on the Linux operating system. In one embodiment, applications execute on a thread which is associated with the server identity. For every authenticated client identity, the application server spawns and maintains a client worker thread, which is mapped to the server identity of the application server 210. The client worker thread is then used to perform operations on behalf of the authenticated client identity. Accordingly, an application thread sends a request for a target resource 218 to the client worker thread and receives the result. As a result, the application thread requests target resources 218 from the client worker thread, and no further access authorizations would be performed.

In another embodiment, the application thread performs the resource request using the server identity. In yet another embodiment, the application thread requests the target resource from the client worker thread, and if access authorization fails, then the server identity would be used to attempt access of the target resources 218. In still another embodiment, the application server 210 maintains a server worker thread, which uses the authenticated client identity to attempt access to the target resources 218.

If it is determined that the client identity, or the server identity, is designated, then the client identity or the server identity is respectively used to attempt authorized access of the target resource according to the retrieved authorization policy. However, if it is determined that the client identity and the server identity is designated, then the client identity and the server identity are used to attempt authorized access of the target resource according to the retrieved authorization policy. A determination is made whether the client identity is authorized to access the target resource. If so, then a determination is made according to the previously retrieved authorization policy whether to use both the client identity and the server identity for authorization to access the target resource. If so, or if it was determined that the client identity is not authorized to access the target resource, then a determination is made whether the server identity is authorized to access the target resource. If access to the target resource is authorized for the client identity, the server identity, or the client identity and server identity as previously described, then the target resource is accessed and the application thread requesting access to the target resource is executed.

Figure 3:
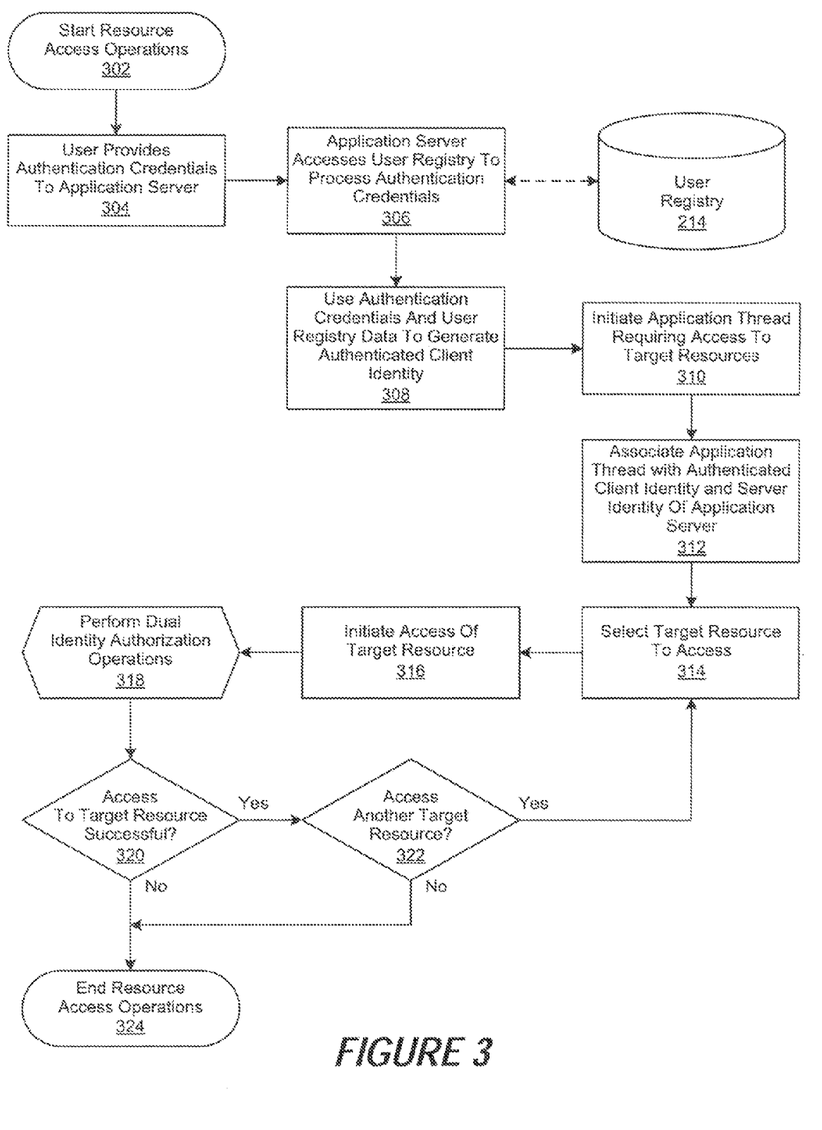
FIG. 3 is a simplified flowchart of the operation of a dual identity authorization module for managing access to resources.

FIG. 3 is a simplified flowchart of the operation of a dual identity authorization module as implemented in accordance with an embodiment of the invention for managing access to resources. In this embodiment, resource access operations are begun in step 302, followed by a user providing authentication credentials to an application server in step 304. The application server, or an associated server, then retrieves user data stored in user registry 214 in step 306. The retrieved user data and the provided authentication credentials are then processed in step 306 to generate an authenticated client identity in step 308. An application thread requiring access to target resources is then initiated in step 310 and associated with the authenticated client identity and the server identity associated with the application server in step 312.

A target resource required for execution of the application thread is selected in step 314 and access of the selected target resource is initiated in step 316. Dual identity authorization operations, as described in greater detail are then performed in 318 to access the target resource. A determination is then made in step 320 to determine whether access to the target resource was successful. If so, then a determination is made in step 322 to determine whether the application thread requires access to another target resource. If so, then the process is continued, proceeding with step 314. Otherwise, or if it is determined in step 320 that access to the target resource was not successful, resource access operations are ended in step 324.

Figure 4A:
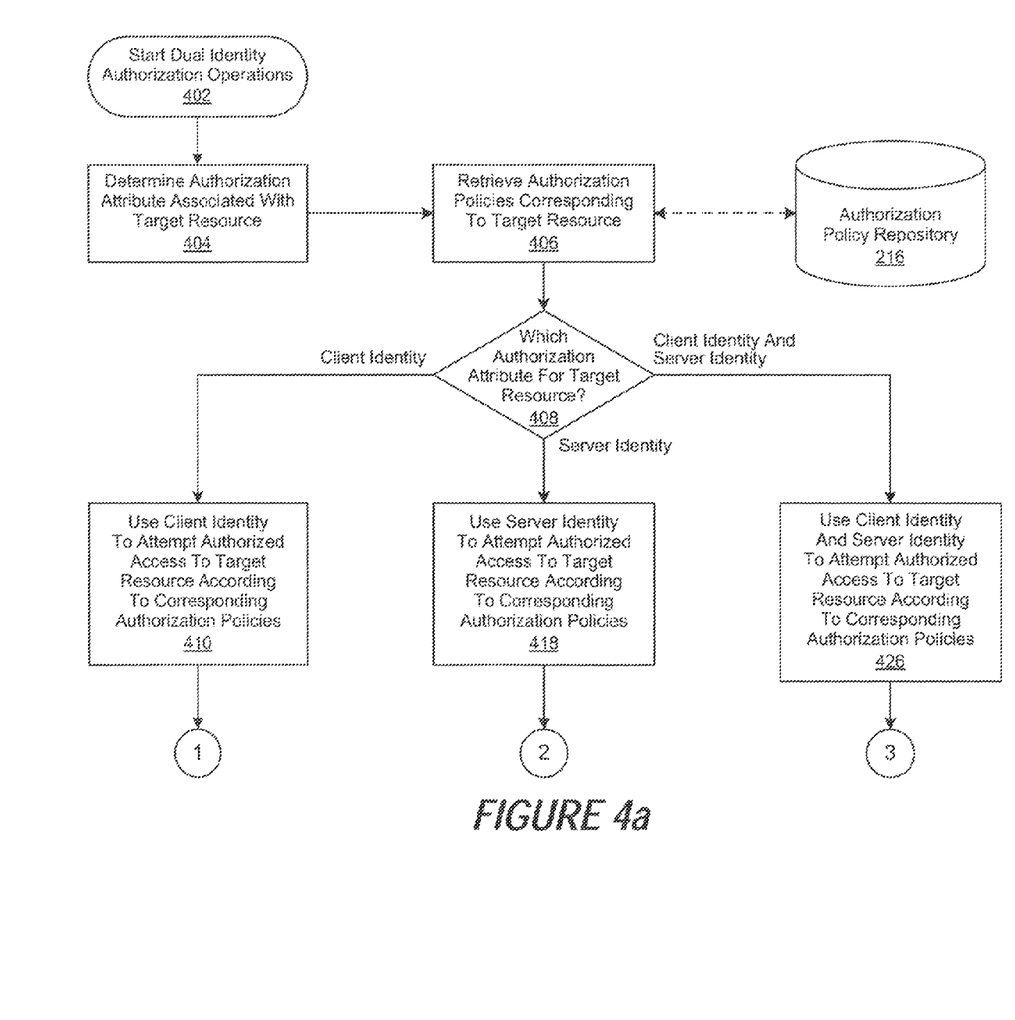
FIG. 4 is a simplified flowchart of the operation of a dual identity authorization module for managing identity authorization operations.
Figure 4B:
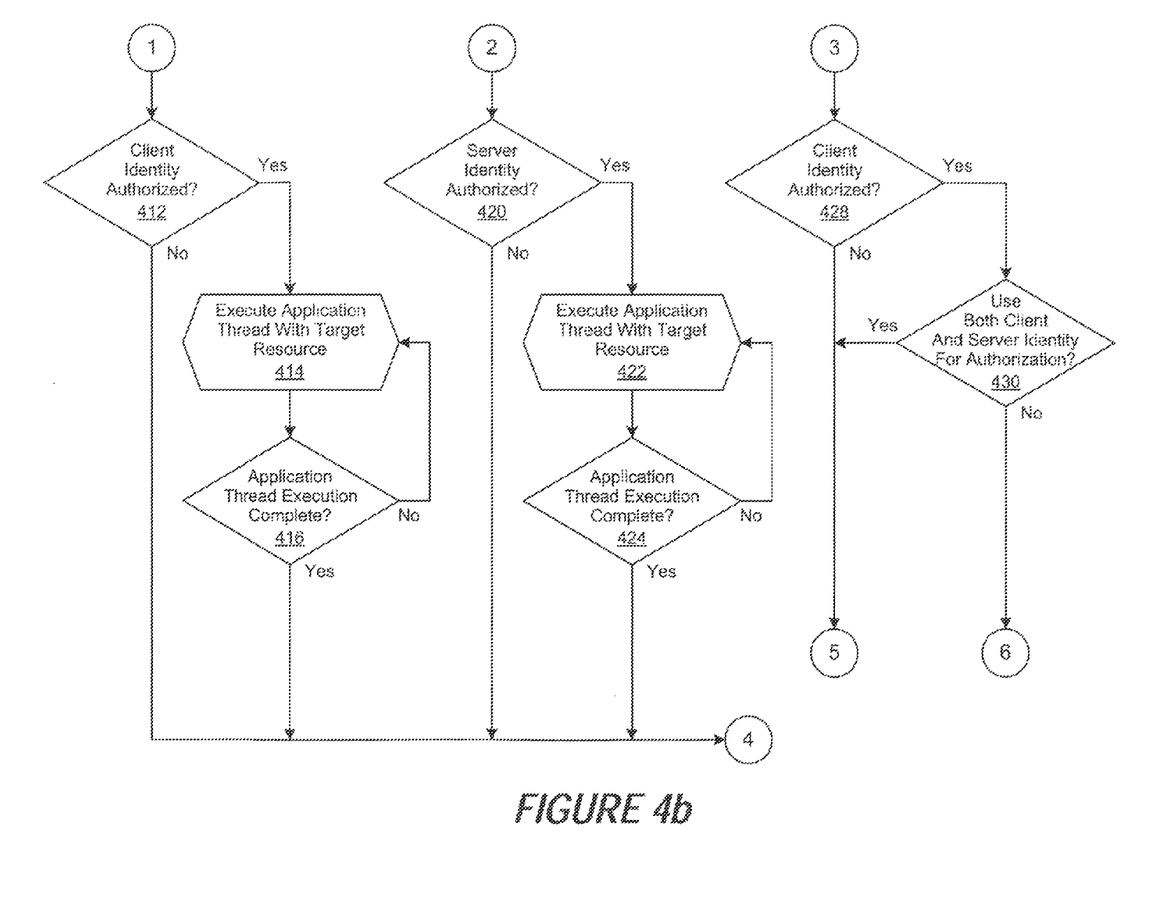
Figure 4C:
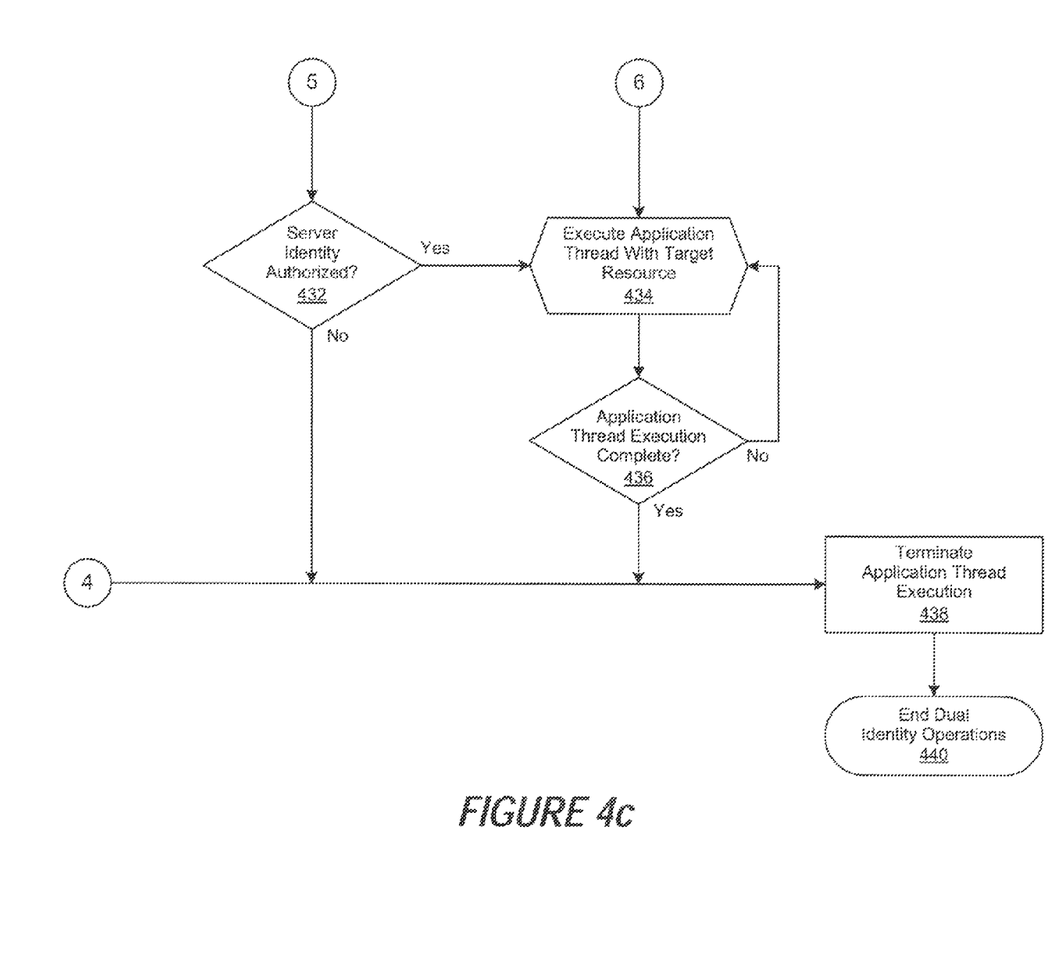

FIG. 4 is a simplified flowchart of the operation of a dual identity authorization module as implemented in accordance with an embodiment of the invention for managing identity authorization operations. In this embodiment, dual identity authorization operations are begun in step 402, followed by determining the resource authorization attribute associated with a desired target resource in step 404. Authorization policies corresponding to the target resource are then retrieved in step 406 from an authorization policy repository 216. A determination is then made in step 408 whether the resource authorization attribute designates the use of a client identity, a server identity, or a client identity and server identity when attempting authorized access of the target resource.

If it is determined in step 408 that the client identity is designated, then the client identity is used to attempt authorized access of the target resource according to the retrieved authorization policy in step 410. A determination is then made in step 412 whether the client identity is authorized to access the target resource. If so, then the application thread requesting access to the target resource is executed in step 414. A determination is then made in step 416 whether execution of the target thread is complete. If not, then the process is continued, proceeding with step 414. Otherwise, or if it is determined in step 412 that the client identity is not authorized to access the target resource, then execution of the application thread is terminated in step 438 and dual identity authorization operations are ended in step 440.

However, if it is determined in step 408 that the server identity is designated, then the server identity is used to attempt authorized access of the target resource according to the retrieved authorization policy in step 418. A determination is then made in step 420 whether the client identity is authorized to access the target resource. If so, then the application thread requesting access to the target resource is executed in step 422. A determination is then made in step 424 whether execution of the target thread is complete. If not, then the process is continued, proceeding with step 422. Otherwise, or if it is determined in step 420 that the client identity is not authorized to access the target resource, then execution of the application thread is terminated in step 438 and dual identity authorization operations are ended in step 440.

However, if it is determined in step 408 that the client identity and the server identity is designated, then the client identity and the server identity are used to attempt authorized access of the target resource according to the retrieved authorization policy in step 426. A determination is then made in step 428 whether the client identity is authorized to access the target resource. If so, then a determination is made in step 430, according to the previously retrieved authorization policy, whether to use both the client identity and the server identity for authorization to access the target resource. If so, or if it was determined in step 428 that the client identity is not authorized to access the target resource, then a determination is made in step 432 whether the server identity is authorized to access the target resource. If so, or if it was determined in step 430 not to use both the client identity and the server identity for authorization to access the target resource, then the application thread requesting access to the target resource is executed in step 434. A determination is then made in step 436 whether execution of the target thread is complete. If not, then the process is continued, proceeding with step 434. Otherwise, of if it is determined in step 432 that the server identity is not authorized to access the target resource, then execution of the application thread is terminated in step 438 and dual identity authorization operations are ended in step 440.

Although the present invention has been described in detail, it should be understood that various changes, substitutions and alterations can be made hereto without departing from the spirit and scope of the invention as defined by the appended claims.

What is claimed is:

1. A computer-implemented method for managing access to resources in an information processing system, comprising:

initiating an application thread comprising a resource authorization attribute, wherein the application thread is initiated on an application server comprising a server identity;

receiving a request from an authenticated client to execute the application thread, wherein the authenticated client comprises a client identity;

executing the application thread, wherein the server identity and the client identity are associated with the application thread; and authorizing access to resources used to execute the application thread, wherein the use of the server identity and the client identity for the access authorization is determined by the resource authorization attribute; and wherein execution of the application thread spawns a client worker thread associated with the client identity, wherein the client worker thread is mapped to the server identity associated with the application thread; and wherein the client identity is stored in a client identity security context and the server identity is stored in a server identity security context, the client identity security context comprising a client identity Accessor Environment Element (ACEE), the server identity security context comprising a server identity ACEE, the client identity ACEE being indexed by a client identity key, the client identity key being derived from the client identity, the server identity ACEE being indexed by a server identity key, the server identity key being derived from the server identity.

2. The method of claim 1, wherein the use of either the server identity or the client identity is determined by the resource authorization attribute.

3. The method of claim 1, wherein the use of both the server identity and the client identity is determined by the resource authorization attribute.

4. The method of claim 1, wherein execution of the application thread spawns a server worker thread associated with the client identity, wherein the server worker thread is mapped to the server identity associated with the application thread.

5. A system comprising:
a processor;
a data bus coupled to the processor; and
a non-transitory computer-usable medium embodying computer program code, the computer-usable medium being coupled to the data bus, the computer program code managing access to resources in an information processing system and comprising instructions executable by the processor and configured for:

initiating an application thread comprising a resource authorization attribute, wherein the application thread is initiated on an application server comprising a server identity;

receiving a request from an authenticated client to execute the application thread, wherein the authenticated client comprises a client identity;

executing the application thread, wherein the server identity and the client identity are associated with the application thread; and authorizing access to resources used to execute the application thread, wherein the use of the server identity and the client identity for the access authorization is determined by the resource authorization attribute; and wherein execution of the application thread spawns a client worker thread associated with the client identity, wherein the client worker thread is mapped to the server identity associated with the application thread; and wherein the client identity is stored in a client identity security context and the server identity is stored in a server identity security context, the client identity security context comprising a client identity Accessor Environment Element (ACEE), the server identity security context comprising a server identity ACEE, the client identity ACEE being indexed by a client identity key, the client identity key being derived from the client identity, the server identity ACEE being indexed by a server identity key, the server identity key being derived from the server identity.

6. The system of claim 5, wherein the use of either the server identity or the client identity is determined by the resource authorization attribute.

7. The system of claim 5, wherein the use of both the server identity and the client identity is determined by the resource authorization attribute.

8. The system of claim 5, wherein execution of the application thread spawns a server worker thread associated with the client identity, wherein the server worker thread is mapped to the server identity associated with the application thread.

9. A non-transitory computer-usable medium embodying computer program code, the computer program code comprising computer executable instructions configured for:

initiating an application thread comprising a resource authorization attribute, wherein the application thread is initiated on an application server comprising a server identity;

receiving a request from an authenticated client to execute the application thread, wherein the authenticated client comprises a client identity;

executing the application thread, wherein the server identity and the client identity are associated with the application thread; and authorizing access to resources used to execute the application thread, wherein the use of the server identity and the client identity for the access authorization is determined by the resource authorization attribute; and wherein execution of the application thread spawns a client worker thread associated with the client identity, wherein the client worker thread is mapped to the server identity associated with the application thread; and wherein the client identity is stored in a client identity security context and the server identity is stored in a server identity security context, the client identity security context comprising a client identity Accessor Environment Element (ACEE), the server identity security context comprising a server identity ACEE, the client identity ACEE being indexed by a client identity key, the client identity key being derived from the client identity, the server identity ACEE being indexed by a server identity key, the server identity key being derived from the server identity.

10. The non-transitory computer usable medium of claim 9, wherein the use of either the server identity or the client identity is determined by the resource authorization attribute.

11. The non-transitory computer usable medium of claim 9, wherein the use of both the server identity and the client identity is determined by the resource authorization attribute.

12. The non-transitory computer usable medium of claim 9, wherein execution of the application thread spawns a server worker thread associated with the client identity, wherein the server worker thread is mapped to the server identity associated with the application thread.

13. The non-transitory computer usable medium of claim 9, wherein the computer executable instructions are stored in a computer readable storage medium in a data processing system and the instructions are downloaded over a network from a remote data processing system.

14. The non-transitory computer usable medium of claim 9, wherein the computer executable instructions are provided by a service provider to a customer on an on-demand basis.

* * * * *